Patented Dec. 19, 1922.

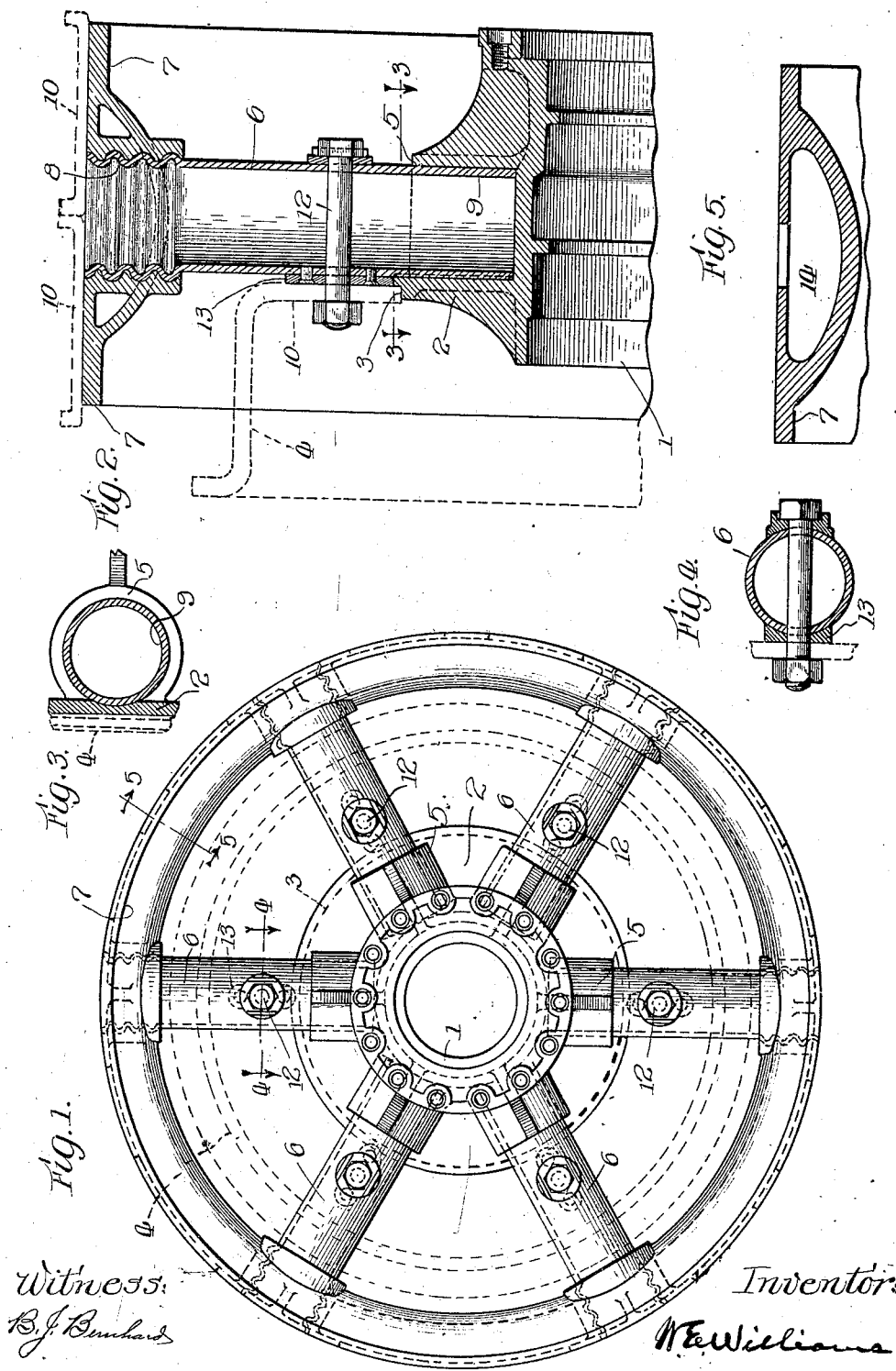

1,439,459

UNITED STATES PATENT OFFICE.

WILLIAM ERASTUS WILLIAMS, OF CHICAGO, ILLINOIS.

PIPE-SPOKED WHEEL.

Application filed December 8, 1919. Serial No. 343,351.

*To all whom it may concern:*

Be it known that I, WILLIAM ERASTUS WILLIAMS, a citizen of the United States, a resident of Chicago, in the county of Cook and State of Illinois, have invented a new and useful Improvement in Pipe-Spoked Wheels, of which the following is a specification.

The object of my invention is to produce an automobile wheel that will be very light, cheaply constructed and very strong, and I arrive at these results, partly through the medium of using wrought metal pipe for spokes, and the invention resides in the arrangement of the fastenings of this pipe into the hub and the rim and the brake drum.

Reference will be had to the accompanying drawing, in which Figure 1 is a front elevation of my wheel.

Figure 2 is a transverse sectional elevation, showing one-half of the wheel on a larger scale than that of Figure 1.

Figure 3 is a transverse section on line 3—3 of Figure 2, showing a cross section of one of the spokes.

Figure 4 is a transverse section on line 4—4 of Figure 1.

Figure 5 is a transverse section of the rim on line 5—5 of Figure 1.

In the drawing, 1 indicates an ordinary hub of an automobile truck wheel. This hub is provided with radially extending flange 2, which goes entirely around the hub, but may, when desired, be fluted or mutilated for lightness. On this flange there rests the inside edge 3 of the brake drum 4 shown in dotted lines.

The hub 1 is provided with a series of spoke sockets 5, here shown as being round, but they may when desired be of other shapes. These spoke sockets are slightly smaller than the pipe that is used for the spokes 6.

The rim of the wheel is made of a casting 7, having cast therein a series of fluted or corrugated walled spoke cavities 8, which in the smallest diameter of the corrugations is slightly larger than the normal outside diameter of the pieces of the pipe 6, which form the spokes.

These cavities 8 and the pipe cavities in the pipe sockets 5 of the hub are simply cleaned out by a coarse rimmer or other tool, in a manner to remove the burrs of the castings and guard against too great a variation in the fits, as relates to the size of holes and the pipe spokes that are to be placed therein.

In assembling the wheel, a hub 1 and a rim 7 are placed in a suitable form for holding them in proper relation.

The pieces of pipe for the spokes have been previously prepared as to the right length, but with smooth surfaces, just as they appear in normal pipe, and then these pipes are entered through the cavities 8 in the rim by being shoved through freely and placed in position and the other ends 9 are forced into the cavities of the spoke sockets under very heavy pressure. This is accomplished by suitable means in the form of hydraulic or screw presses or any other means whereby the short pieces of pipe may be pressed into the spoke cavities of the hub very tightly, in which operation the tube of the pipe is slightly compressed and made to enter into the pipe sockets with what may be termed, the full limit of possibility of frictional contact, so as to resist the action of withdrawing the spokes. By this means we secure approximately a union of the pipe spokes with the hub, almost amounting to an integral construction of those metal parts.

After the pipe spokes have been pressed into the hub sockets and suitably arranged, an expanding rolling tube is entered into the outer ends of the pieces of pipe lying in the cavities 8 of the rim and the ends are expanded and rolled out into contact with the walls of the cavities 8, after the manner of tightening boiler tubes in the flue sheets, and in this manner the ends of the pieces of pipe are made to fit into the corrugated or fluted cavities of the rim in a very secure relationship, amounting to a fitting together of these parts, both as to tension and compression so as to be the equivalent of an integral union of said parts with each other.

Since this wheel is being used for an automobile truck wheel and most of such wheels are employed with what are known as "pressed on" tires, the steel bases of the solid rubber tires are pressed tightly over the outside of the rim 7, as is indicated by 10, and thus the outer ends of the pipe spokes 6 directly abut these steel bases of the rubber tires, and carry compression strain directly to the bases, shown in dotted lines in Fig. 2.

The brake drum flange 10 of the brake drum 4 is secured to the spokes by bolts 12 and there is provided a series of little pads 13 on the sides of the spokes for filling out the short spokes between the sides of the pipes and the flange 10 of the brake drum.

While various shapes may be given to the section of my cast ring which forms the tread of the rim of the wheel, I prefer to use the section shown in Figure 5 in which there is the cavity 14 extending over the region between the spoke positions. This boxed or enclosed section merges into the walls of the spoke sockets where the spokes are joined.

This section as shown in Figure 5 becomes a very strong girder between the spokes and at the same time consumes a small quantity of metal relative to other forms that might be used for this section.

What I claim is:—

1. The combination with a metal rim having a broad tread provided with an internal medial rib which has spaced perforations the walls of which are recessed, of tubular metal spokes primarily passing freely through the perforations and expanded into the recesses therein.

2. The combination with a hub having spoke-receiving sockets, of a rim having its medial portion inwardly thickened to form a circumferential rib with perforations having laterally recessed walls and registering with the sockets, respectively, and tubular spokes primarily slightly smaller than the perforations and larger than the sockets, and adapted to be pressed endwise into the sockets and expanded into the recesses of the said walls.

3. In a wheel of the class described, a hub having spoke sockets; a completely formed integral annular rim having spoke cavities in the rim larger than the cavities for the spokes in the hub with pipe sectional spokes entered through the cavities of the rim and compressed into the hub sockets with their other ends expanded into the rim sockets, whereby the parts are secured together.

4. In a wheel of the class described, a cast ring for a rim and said rim having radial apertures in which the spokes are secured in combination with a box girder section between the spokes.

5. The combination with a broad rim having spaced spoke-receiving openings with internally recessed, sleeve-like walls, of tubular ductile spokes inserted in said openings, respectively, and expanded into the recesses of said walls.

Signed at Chicago, in the county of Cook and State of Illinois, this 1st day of December, 1919.

WILLIAM ERASTUS WILLIAMS.

Witnesses:
  B. J. BERNHARD,
  J. B. JEFFERSON.